Patented Aug. 11, 1931

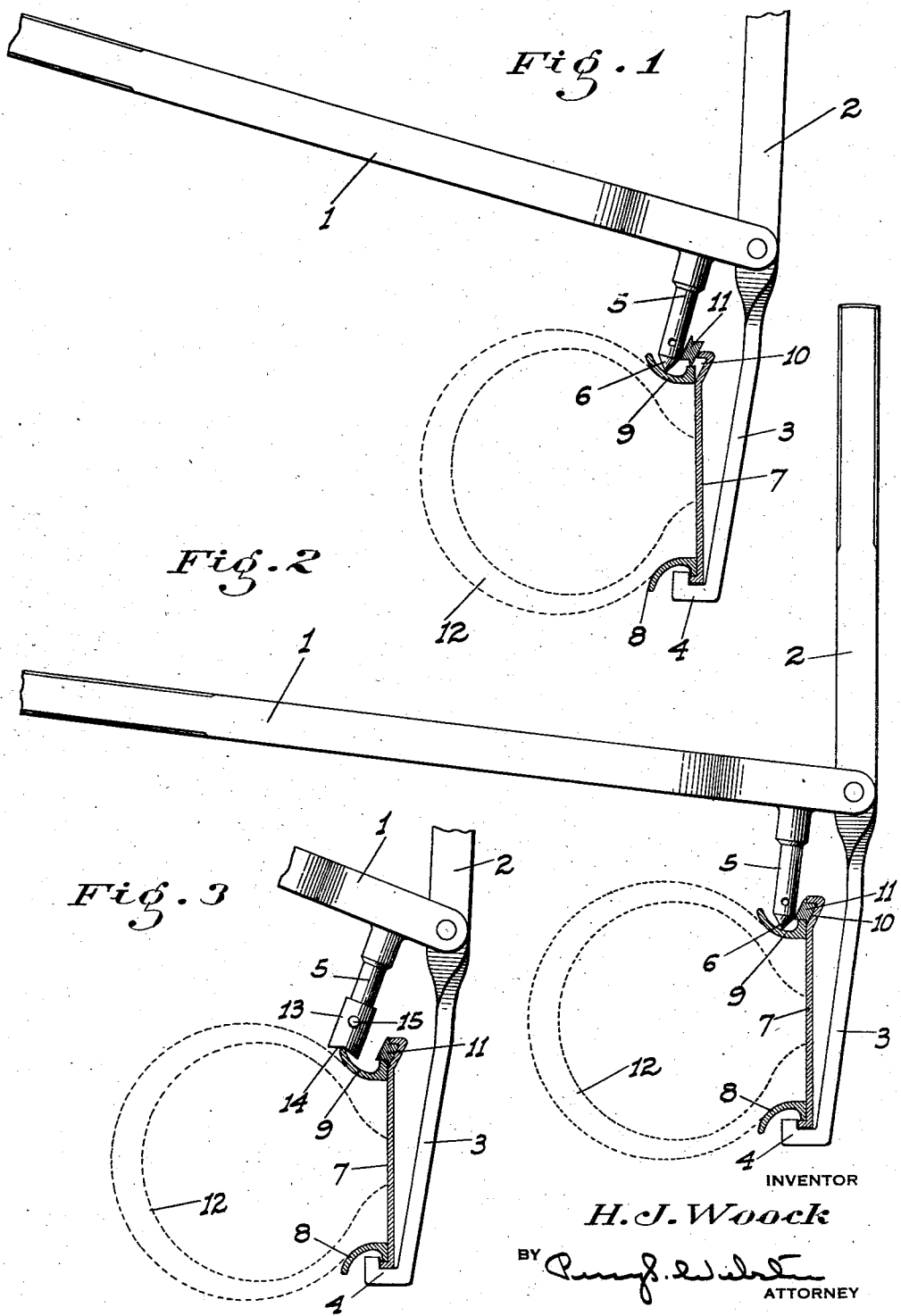

1,818,517

UNITED STATES PATENT OFFICE

HERBERT J. WOOCK, OF LODI, CALIFORNIA, ASSIGNOR TO SUPER MOLD CORPORATION, OF RENO, NEVADA, A CORPORATION

RIM TOOL

Application filed January 8, 1930. Serial No. 419,393.

This invention relates to tools for use in mounting or dismounting tires on one-piece rims which have a removable bead engaging flange and a removable locking ring engaging the rim outwardly of said flange to prevent displacement of the same. Such rims are particularly used in connection with large heavy duty tires which are so bulky and relatively nonyielding as to offer considerable resistance to the placing of the removable flange and the locking ring.

The principal object of my invention is to provide a tool adapted to be used with rims of this character by means of which the removable flange may be easily pressed into place against the resistance offered by the tire, and the locking ring at the same time caused to snap into place. The tool is also provided with an attachment rendering the same available for further depressing the flange to enable the locking ring to be easily removed when desired to withdraw the flange and remove the tire.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Fig. 1 is a side elevation of my improved tool as in use in connection with a rim showing the initial position of the removable flange and locking ring.

Fig. 2 is a similar view showing the flange and ring as finally seated in place.

Fig. 3 is a fragmentary view of the tool showing the same as equipped and used to enable the locking ring to be withdrawn.

Referring now more particularly to the drawings, characters of reference on the drawings, the numeral 1 denotes a rigid lever and handle-bar of suitable length which at one end is pivoted to a combination handle and rim engaging member intermediate the ends of the same. Said member comprises a handle portion 2 above the lever and a lower arm 3 terminating at its end in a hook 4 turned toward the lever. Depending from and rigid with the lever near the connection of the same with the arm 3 is a stem 5 terminating in a tapered point 6.

The rim with which the tool is to be used comprises a main rim portion 7 having a bead engaging flange 8 seated adjacent one edge of the same, and a removable bead engaging flange 9 adapted to be slid onto the rim from over the opposite edge of the same after the tire has been placed. Adjacent said edge the rim is formed with an outwardly projecting V-shaped annular groove 10, adapted to partially receive the usual slit locking ring 11, which when in place cooperates with the flange 9 to prevent removal of the same.

When mounting a tire 12 onto the rim its beads are first slid onto the rim as usual. The flange 9 is then placed on the rim. If this flange could at once assume its final position it would of course be very easy to insert the locking ring into its groove. The resistance of the tire however prevents the flange from thus moving into place and is so great that it is almost impossible to press the flange down by hand the necessary distance and at the same time force the spring locking ring into seating position in its groove.

With my improved tool however such difficulties are entirely overcome. In using the tool the tire and rim are laid flat on the floor with the locking ring edge uppermost. The tool is positioned so that the lever extends across the tire with the arm 3 depending alongside the rim with its hook 4 engaging the lower edge of the rim as shown. With one hand grasping the handle 2 and the other the lever the stem 5 is manipulated so that its point engages the removable flange; the locking ring being first placed as near in position as it is possible to do, as indicated in Fig. 1. Depression of the lever then causes the flange 9 to be depressed, as will be evident, and when it is about in its proper position the handle 2 is low manipulated, while the pressure on the lever is maintained, so that the side of the stem presses against the locking ring and forces the same into seating position in the groove, as shown in Fig. 2. When thus acting against the locking ring, the pointed end of the stem moves across the depressed surface of the flange from the position shown in Fig. 1 to that shown in Fig. 2. It is of course to be understood that the free end of the ring is first inserted and then the tool is shifted about the rim to take another grip and these operations are repeated until the locking ring is seated over its full length.

To enable the tool to be used when it is desired to remove the flange I provide a sleeve or socket 13 adapted to fit over the point of the stem 5 and having a shallow V-shaped notch 14 cut in its outer end so as to engage the outer edge of the removable rim flange, as shown in Fig. 3. This sleeve is removably held in proper position on the stem by a pin 15 inserted transversely through said sleeve and the stem. The notch in the sleeve prevents the same from slipping off the flange and spaces the stem and sleeve from the rim proper the necessary distance to enable the locking ring to be withdrawn into the space between the sleeve and the position normally occupied by said ring when the lever is further depressed from the position shown in Fig. 3.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A rim-tool comprising a rigid arm having a handle-extension projecting from one end thereof and rigid therewith, a hook element on one end of the arm to engage one side of the rim and facing the other end of the arm, a rigid lever pivoted at one end on the arm at a distance on the latter from the hook greater than the width of a rim and projecting from the hook side of the arm, and an element to engage the other side of the rim rigid with and depending from the lever toward the hook.

In testimony whereof I affix my signature.

HERBERT J. WOOCK.